United States Patent
Foti et al.

(10) Patent No.: US 12,316,712 B2
(45) Date of Patent: May 27, 2025

(54) SERVICE BASED INTERFACE ENABLED HOME SUBSCRIBER SERVICE SELECTION

(71) Applicant: Telefonaktiebolaget LM Ericsson (publ), Stockholm (SE)

(72) Inventors: George Foti, Dollard des Ormeaux (CA); David Castellanos Zamora, Madrid (ES); Maria Cruz Bartolome Rodrigo, Madrid (ES); Jose Miguel Dopico Sanjuan, Torrelodones (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 400 days.

(21) Appl. No.: 17/442,963

(22) PCT Filed: Feb. 20, 2020

(86) PCT No.: PCT/EP2020/054448
§ 371 (c)(1),
(2) Date: Sep. 24, 2021

(87) PCT Pub. No.: WO2020/200577
PCT Pub. Date: Oct. 8, 2020

(65) Prior Publication Data
US 2022/0224760 A1   Jul. 14, 2022

(30) Foreign Application Priority Data
Mar. 29, 2019   (EP) .................................... 19382226
Jun. 7, 2019    (EP) .................................... 19382482

(51) Int. Cl.
*H04L 12/00*       (2006.01)
*H04L 65/1016*     (2022.01)
(Continued)

(52) U.S. Cl.
CPC .......... *H04L 67/51* (2022.05); *H04L 65/1016* (2013.01); *H04L 67/1012* (2013.01);
(Continued)

(58) Field of Classification Search
CPC . H04L 67/51; H04L 65/1016; H04L 67/1012; H04L 67/142; H04L 67/146; H04W 80/10; H04W 84/042
See application file for complete search history.

(56) References Cited

U.S. PATENT DOCUMENTS

2011/0026460 A1 * 2/2011 Lafuente Alvarez ...................... H04L 61/4588 370/328
2017/0238359 A1   8/2017 Atarius et al.
(Continued)

FOREIGN PATENT DOCUMENTS

CN   102474523 A   5/2012
CN   104247362 A   12/2014
(Continued)

OTHER PUBLICATIONS

3GPP TS 23.502 V15.3.0; 3rd Generation Partnership Project; Technical Specification Group Services and System Aspects; Procedures for the 5G System; Stage 2 (Release 15); Sep. 2018, consisting of 330—pages.
(Continued)

*Primary Examiner* — Noel R Beharry
*Assistant Examiner* — Lionel Preval
(74) *Attorney, Agent, or Firm* — Weisberg I.P. Law, P.A.

(57) ABSTRACT

Embodiments described herein relate to methods and apparatus for obtaining and/or providing Home Subscriber Service, HSS, information. A method in a first service based architecture, SBI, capable Internet Protocol Multimedia Subsystem, IMS, entity includes: transmitting a discovery
(Continued)

request to a network repository function, NRF; receiving a response comprising HSS information from the NRF; and transmitting at least a portion of the HSS information to a second SBI capable IMS entity.

19 Claims, 7 Drawing Sheets

(51) Int. Cl.
    *H04L 67/1012* (2022.01)
    *H04L 67/142* (2022.01)
    *H04L 67/146* (2022.01)
    *H04L 67/51* (2022.01)
    *H04W 80/10* (2009.01)
    *H04W 84/04* (2009.01)

(52) U.S. Cl.
    CPC .......... *H04L 67/142* (2013.01); *H04L 67/146* (2013.01); *H04W 80/10* (2013.01); *H04W 84/042* (2013.01)

(56) References Cited

U.S. PATENT DOCUMENTS

| | | | |
|---|---|---|---|
| 2019/0053010 | A1 | 2/2019 | Edge et al. |
| 2019/0053295 | A1 | 2/2019 | Castellanos Zamora et al. |
| 2019/0140933 | A1* | 5/2019 | Guim Bernat ...... H04L 47/2425 |
| 2019/0166467 | A1* | 5/2019 | Livanos ................ H04W 8/186 |
| 2019/0207778 | A1* | 7/2019 | Qiao .................... H04W 76/10 |
| 2019/0387401 | A1* | 12/2019 | Liao .................. H04W 28/0289 |
| 2020/0344576 | A1* | 10/2020 | Li ............................ H04W 4/08 |

FOREIGN PATENT DOCUMENTS

| | | |
|---|---|---|
| CN | 109314942 A | 2/2019 |
| JP | 2004533173 A | 10/2004 |
| JP | 200816944 A | 1/2008 |
| WO | WO-2019073115 A1 * | 4/2019 |

OTHER PUBLICATIONS

3GPP TS 23.501 V15.3.0; 3rd Generation Partnership Project; Technical Specification Group Services and System Aspects; System Architecture for the 5G System; Stage 2 (Release 15); Sep. 2018, consisting of 226—pages.

Chinese Office Action and English Summary dated Nov. 18, 2022 for Application No. 202080024758.2, consisting of 12 pages.

International Search Report and Written Opinion dated May 20, 2020 for International Application No. PCT/EP2020/054448 filed Feb. 20, 2020, consisting of 13—pages.

3GPP TR 23.794 V1.0.0; 3rd Generation Partnership Project; Technical Specification Group Services and System Aspects; Study on Enhanced IMS to 5GC Integration (Release 16); Mar. 2019, consisting of 83—pages.

SA WG2 Meeting #132 S2-19003011; Title: IMS discovery for HSS Interface type, and user HSS instance; Agenda Item: 6.14; Source: Ericsson; Work Item/Release: eIMS5G/Release 16; Document for: Approval; Date and Location: Apr. 8-12, 2019, Xian China, 25, consisting of 8—pages.

Japanese Office Action and English Summary dated Apr. 19, 2024 for Application No. 2023008932, consisting of 5 pages.

SA WG2 Meeting #S2-117 S2-165652; Change Request; Title: Correction of ICS IVVF behaviour for inbound roamers; Source to WG: NEC; Source to TSG: SA WG2; Date and Location: Oct. 17-21, 2026, Kaohsiung City Taiwan; consisting of 3 pages.

* cited by examiner

SERVICE BASED INTERFACE ENABLED HOME SUBSCRIBER SERVICE SELECTION

CROSS-REFERENCE TO RELATED APPLICATIONS

This application is a Submission Under 35 U.S.C. § 371 for U.S. National Stage Patent Application of International Application No.: PCT/EP2020/054448, filed Feb. 20, 2020 entitled "SERVICE BASED INTERFACE ENABLED HOME SUBSCRIBER SERVICE SELECTION," which claims priority to European Application Nos.: 19382226.9, filed Mar. 29, 2019, and 19382482.8, filed Jun. 7, 2019, the entireties of all of which are incorporated herein by reference.

TECHNICAL FIELD

Embodiments described herein relate to methods and apparatus for obtaining and/or providing information relating to a Home Subscriber Server.

BACKGROUND

The IP Multimedia Subsystem or IP Multimedia Core Network Subsystem (IMS) is an architectural framework for delivering IP multimedia services. Historically, mobile phones have provided voice call services over a circuit-switched-style network, rather than strictly over an IP packet-switched network. Alternative methods of delivering voice (VoIP) or other multimedia services have become available on smartphones, but they have not become standardized across the industry. IMS is an architectural framework to provide such standardization.

A Network Repository Function (NRF) may be used by a Service Based Interface (SBI) capable IMS entity (for example, an Interrogating Call Session Control Function (I-CSCF), a Serving Call Session Control Function S-CSCF or an IMS Application Sever (AS)) to select the interface type to be used with a Home Subscriber Server (HSS) instance and to discover SBI capable HSS instances handling a particular subscriber.

Figure 1:
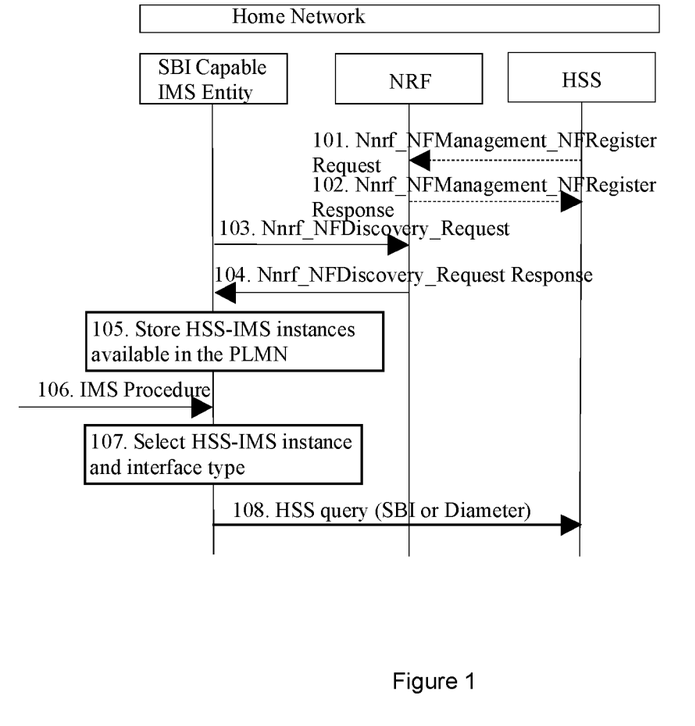
FIG. 1 illustrates HSS instance and interface type discovery and selection via an NRF.

FIG. 1 illustrates HSS instance and interface type discovery and selection via an NRF.

In step 101 an SBI capable HSS registers in the NRF using Nnrf_NFManagement_NFRegister_Request. In this example, different instances of HSS supporting different sets of user identification (e.g. pairs of IP Multimedia Private Identity IMPI and IP Multimedia Public Identity IMPUs) are deployed in the Public Land Mobile Network (PLMN), the HSS may include in the NRF registration the IMPI/IMPU ranges and/or HSS Group ID it supports.

In this example, if HSS within the PLMN is enabled to support SBI interactions then the NRF will not keep any Network Function (NF) profile for SBI capable HSS instances.

In step 102, the NRF registers the HSS instance in NRF and replies with a Nnrf_NFManagement_NFRegister_Response.

In step 103, an SBI capable IMS entity may discover the SBI capable HSS instances available in the PLMN at any time using a Nnrf_NFDiscovery_Request.

In step 104, the NRF provides the SBI capable IMS entity with the HSS instances registered in the PLMN. In some examples, different instances of HSS supporting different sets of IMPI/IMPUs are deployed in the PLMN, in which case the NRF may include the IMPI/IMPU ranges and/or HSS Group ID each available SBI capable HSS instance supports.

If no SBI capable HSS instance is available in the PLMN, then the NRF may reply to the SBI capable IMS entity with no information about available SBI capable HSS instances.

In step 105, the SBI capable IMS entity stores the result of the NRF discovery.

The SBI capable IMS entity may request the NRF to be notified of updates in the SBI capable HSS instances registered in NRF by using a Nnrf_NFManagement_NFStatusSubscribe service operation.

In step 106, the SBI capable IMS entity receives an IMS procedure related to a given IMS user (IMPI or IMPU depending on the procedure).

In step 107 the SBI capable IMS entity selects an HSS instance suitable for the IMS user. Towards that end, the SBI capable IMS entity checks in the list of available SBI capable HSS instances provided by the NRF in step 5, if there is any SBI capable HSS instance available in the PLMN that can serve the IMS user.

If suitable SBI capable HSS instance(s) to serve the IMS user are found, the SBI capable IMS entity selects one and uses SBI IMS services to communicate with the selected SBI capable HSS instance.

The SBI capable IMS entity may have to execute an additional HSS discovery procedure e.g. if a previous HSS discovery procedure (steps 3-4) indicates that SBI capable HSS instances exists in the PLMN but they are deployed using different HSS Group IDs. This will be described in more detail with reference to FIG. 2.

In this case the SBI capable IMS entity sends a Nnrf_NFDiscovery_Request message to the NRF comprising the IMS user identity included in the IMS procedure. The NRF stores a mapping between HSS Group ID and IMS user identities to enable discovery of SBI capable HSS using the received user identity (IMPI/IMPU).

If no SBI capable HSS instance is found for the IMS user identity, the SBI capable IMS entity shall then attempt to communicate with the HSS using Diameter procedures.

In step 108, the SBI capable IMS entity starts interaction with the selected HSS instance.

Figure 2:
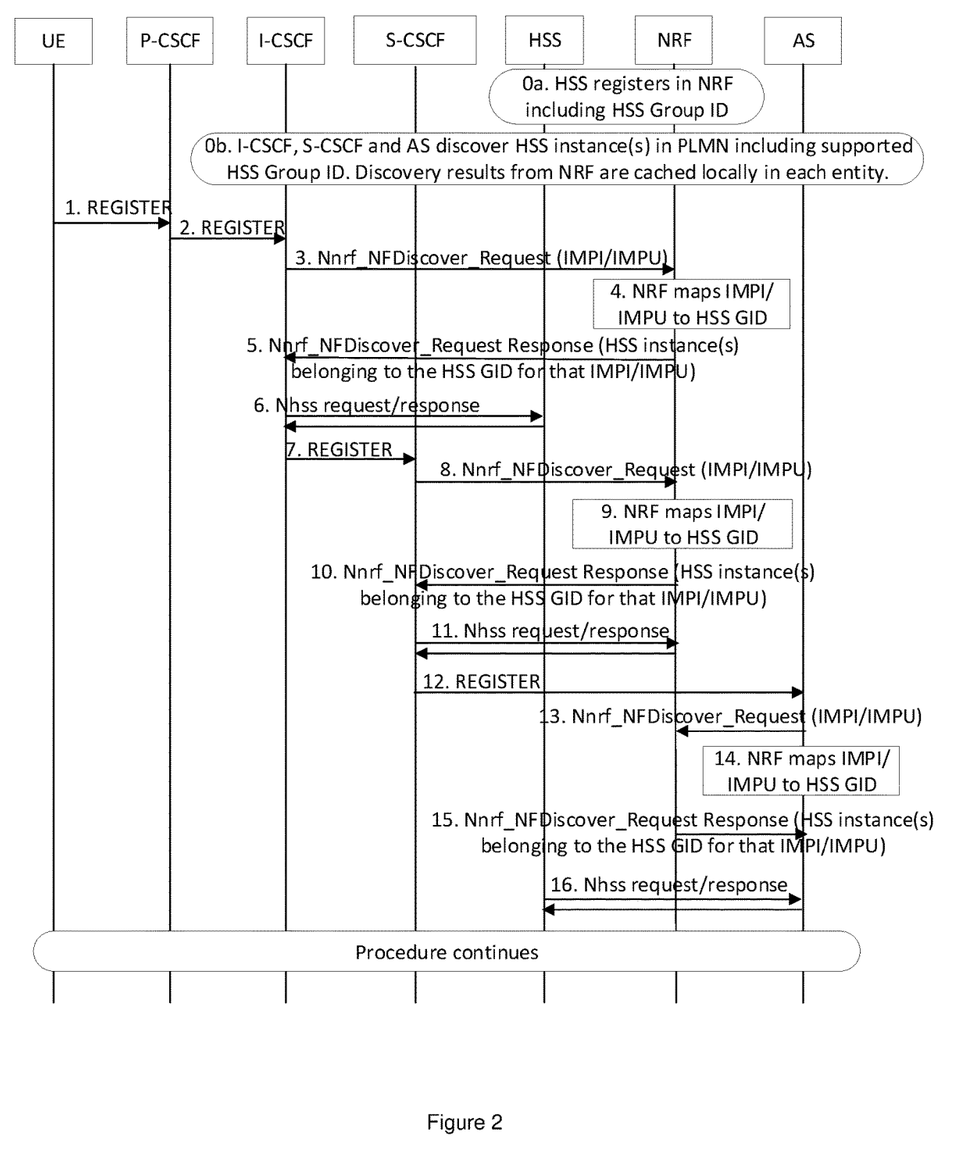
FIG. 2 illustrates that the same discovery procedure has to be repeated by every IMS capable node when a HSS Group ID is used by a HSS instance.

In the example described in step 107 in which multiple SBI capable HSS instances supporting different sets of IMPI/IMPUs are deployed in a PLMN, and the NRF provides the HSS group ID, to the SBI capable IMS entity, the SBI capable IMS entity needs to perform a second discovery with the NRF to locate the HSS instance corresponding to the registering IMPI/IMPU. To that effect, the SBI capable IMS entity sends the Nnrf_NFDiscovery_Request message to the NRF and includes the IMPI/IMPU pair received in the IMS procedure. FIG. 2 illustrates this procedure in more detail.

In step 0a of FIG. 2, an SBI capable HSS registers in the NRF using Nnrf_NFManagement_NFRegister_Request, for example as in step 101 of FIG. 1. The HSS registers in this case one or more Group ID.

In step 0b, any SBI capable IMS entity (I-CSCF, AS, S-CSCF, etc.) may discover the SBI capable HSS instances, according to the procedure described above in steps 103 to 105, including the Group ID available in the PLMN at any time using a nrf_NFDiscovery_Request. Each SBI capable IMS entity performing a discovery caches the result of the NRF discovery.

In step 1 of FIG. 2, after the wireless device has obtained IP connectivity, it may perform IMS registration. To do so, the wireless device sends the Register information flow to the Proxy Call Session Control Function (P-CSCF).

In step 2 of FIG. 2, the P-CSCF sends a Register information flow to the I-CSCF.

In step 3 of FIG. 2, the I-CSCF locates in its cache only HSS instance(s) with a Group ID and may need to do a second discovery to locate the HSS instance handling the registering UE IMPI/IMPU pair. The I-CSCF sends an Nnrf_NFDiscovery_Request to the NRF and includes the registering IMPI/IMPU.

In step 4 of FIG. 2, the NRF maps the IMPI/IMPU to the HSS Group ID.

In step 5 of FIG. 2, the NRF returns to the I-CSCF the HSS instance corresponding to the Group ID for the registering IMPI/IMPU as well as the Group ID.

In step 6 of FIG. 2, the I-CSCF queries the HSS instance to locate the S-CSCF allocated to the UE to fetch the context information for the registering IMPU/IMPI pair by sending a Nhss_ims_UECM_Get request to the UDM/HSS.

In step 7 of FIG. 2, the I-CSCF forwards the Register request to the S-CSCF.

In step 8 of FIG. 2, the S-CSCF has to locate the HSS instance for the registering wireless device. It performs the same steps 3-5 executed by the I-CSCF. The S-CSCF sends an Nnrf_NFDiscovery_Request to the NFR and includes the registering IMPI/IMPU.

In step 9 of FIG. 2, the NRF maps the IMPI/IMPU to the HSS Group ID.

in step 10 of FIG. 2, the NRF returns to the S-CSCF the HSS instance corresponding to the Group ID for the registering IMPI/IMPU.

In step 11 of FIG. 2, the S-CSCF fetches the registered IMPI/IMPU related subscriber information by sending to UDM/HSS Nhss_ims_SDM Get request and receiving the profile in the corresponding response.

In step 12 of FIG. 2, the S-CSCF sends the REGISTER Request to the AS in case of third-party registration.

In step 13 of FIG. 2, the AS has to locate the HSS instance for the registering UE. It performs the same store 3-5 executed by the I-CSCF. The AS sends an Nnrf_NFDiscovery_Request to the NFR and includes the registering IMPI/IMPU.

In step 14 of FIG. 2, the NRF maps the IMPI/IMPU to the HSS Group ID.

In step 15 of FIG. 2, the NRF returns to the AS the HSS instance corresponding to the Group ID for the registering IMPI/IMPU.

In step 16 of FIG. 2, the AS queries the HSS instance for the UE profile.

As can be seen from FIG. 2, multiple SBI capable IMS entities within a PLMN (I-CSCF, S-CSCF and IMS AS) repeat the same procedures to determine the type of interface to use to interact with HSS and to discover and select the SBI capable HSS instances applicable for a given IMS user (IMPI/IMPU) when SBA interactions can be used.

This represents a significant and unneglectable amount of signaling towards the NRF. Additionally, this will imply additional delays in the wireless device traffic procedures during registration and call procedures.

The NRF design is suited for off line traffic independent in most of the cases of UE procedures and this amount of signaling related to individual IMS user based discovery requests from SBI capable IMS entities may negatively impact the normal operation and performance of the NRF and NFs as the results of these IMS User based discovery requests cannot be cached in NF consumers for use with network procedures related to other IMS users.

SUMMARY

According to some embodiments there is provided a method in a first service based architecture, SBI, capable Internet Protocol Multimedia Subsystem, IMS, entity for providing information relating to a first Home Subscriber Service, HSS, instance. The method comprises receiving a user identification in a message; transmitting a request to a network repository function, NRF, wherein the request comprises the user identification; receiving an indication of a first HSS group identification from the NRF; and transmitting the indication of the first HSS group identification to a second SBI capable IMS entity.

According to some embodiments there is provided a method, in a second service based architecture, SBI, capable Internet Protocol Multimedia Subsystem, IMS, entity for providing information relating to a first Home Subscriber Service, HSS, instance. The method comprises receiving a message comprising a user identification and an indication of a first HSS group identification; and selecting a first HSS instance from a stored indication of a plurality of HSS instances, wherein the plurality of HSS instances are each associated with at least one HSS group identification, by selecting the first HSS instance having an associated HSS group identification that matches the first HSS group identification.

According to some embodiments there is provided a first service based architecture, SBI, capable Internet Protocol Multimedia Subsystem, IMS, entity for providing information relating to a first Home Subscriber Service, HSS, instance. The first SBI capable IMS entity comprises processing circuitry configured to: receive a user identification in a message; transmit a request to a network repository function, NRF, wherein the request comprises the user identification; receive an indication of a first HSS group identification from the NRF; and transmit the indication of the first HSS group identification to a second SBI capable IMS entity.

According to some embodiments there is provided a second service based architecture, SBI, capable Internet Protocol Multimedia Subsystem, IMS, entity for providing information relating to a first Home Subscriber Service, HSS, instance. The second SBI capable IMS entity comprises processing circuitry configured to: receive a message comprising a user identification and an indication of a first HSS group identification; and select a first HSS instance from a stored indication of a plurality of HSS instances, wherein the plurality of HSS instances are each associated with at least one HSS group identification, by selecting the first HSS instance having an associated HSS group identification that matches the first HSS group identification.

According to some embodiments there is provided a method in a first service based architecture, SBI, capable Internet Protocol Multimedia Subsystem, IMS, entity for obtaining and providing Home Subscriber Service, HSS, information, the method comprising the steps of: transmitting a discovery request to a network repository function, NRF; receiving a response comprising HSS information from the NRF; and transmitting at least a portion of the HSS information to a second SBI capable IMS entity.

According to some embodiments there is provided a method, in a second service based architecture, SBI, capable Internet Protocol Multimedia Subsystem, IMS, entity for obtaining Home Subscriber Service, HSS, information, the method comprising:

receiving a message comprising HSS information from a first SBI capable IMS entity, wherein the HSS information relates to a Public Land Mobile Network, PLMN.

According to some embodiments there is provided a first service based architecture, SBI, capable Internet Protocol Multimedia Subsystem, IMS, entity for obtaining and providing Home Subscriber Service, HSS, information, the first SBI capable IMS entity comprising processing circuitry configured to:

transmit a discovery request to a network repository function, NRF;

receive a response comprising HSS information from the NRF; and transmit at least a portion of the HSS information to a second SBI capable IMS entity.

According to some embodiments there is provided a second service based architecture, SBI, capable Internet Protocol Multimedia Subsystem, IMS, entity for obtaining Home Subscriber Service, HSS, information, the second SBI capable IMS entity comprising processing circuitry configured to:

receive a message comprising HSS information from a first SBI capable IMS entity, wherein the HSS information relates to a Public Land Mobile Network, PLMN.

BRIEF DESCRIPTION OF THE DRAWINGS

For a better understanding of examples of the present disclosure, and to show more clearly how the examples may be carried into effect, reference will now be made, by way of example only, to the following drawings in which.

DESCRIPTION

The following sets forth specific details, such as particular embodiments for purposes of explanation and not limitation. It will be appreciated by one skilled in the art that other embodiments may be employed apart from these specific details. In some instances, detailed descriptions of well-known methods, nodes, interfaces, circuits, and devices are omitted so as to not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

FIG. 2 illustrates that the same discovery procedure has to be repeated by every IMS capable node when a HSS Group ID is used by a HSS instance, and no HSS instance is located in the cache of the IMS capable node for the registering IMPI/IMPU. This is inefficient and can be optimized to avoid the repetitive procedures by all these IMS capable nodes.

In embodiments described herein, the actual discovery procedure to locate the HSS instance corresponding to a Group ID is only performed once. The Group ID may then passed on, for example in the SIP signaling, to all IMS nodes in the SIP signaling path. These IMS nodes will examine their own caches to locate the HSS instance corresponding to the received Group ID, since they had already executed the discovery procedure to fetch the HSS information from NRF and cached the result. Hence they can avoid performing a second query with the NRF using the IMPI/IMPU.

The improvement/optimization in the interface type and SBI capable HSS selection processes executed by SBI capable IMS entities (e.g. I-CSCF, S-CSCF and IMS AS) described herein allows for a significant reduction in NRF traffic in scenarios where SBI Capable HSS instances are deployed in the PLMN and/or when segments of SBI capable HSSs managing different sets of users within the HPLMN are deployed and the HSS segmentation is not realized using IMPI/IMPU ranges.

Additionally, by avoiding the NRF interaction during the execution of related wireless device traffic procedures, the latency in these procedures will not suffer any unnecessary delays.

Furthermore, SBI capable IMS entities may optimize the storage of HSS discovery procedures as IMS user based HSS discovery requests will be avoided or at least minimized to an extent, and all or most NRF discovery results may then be cached and used for HSS selection in the context of multiple SUPIs.

Figure 3A:
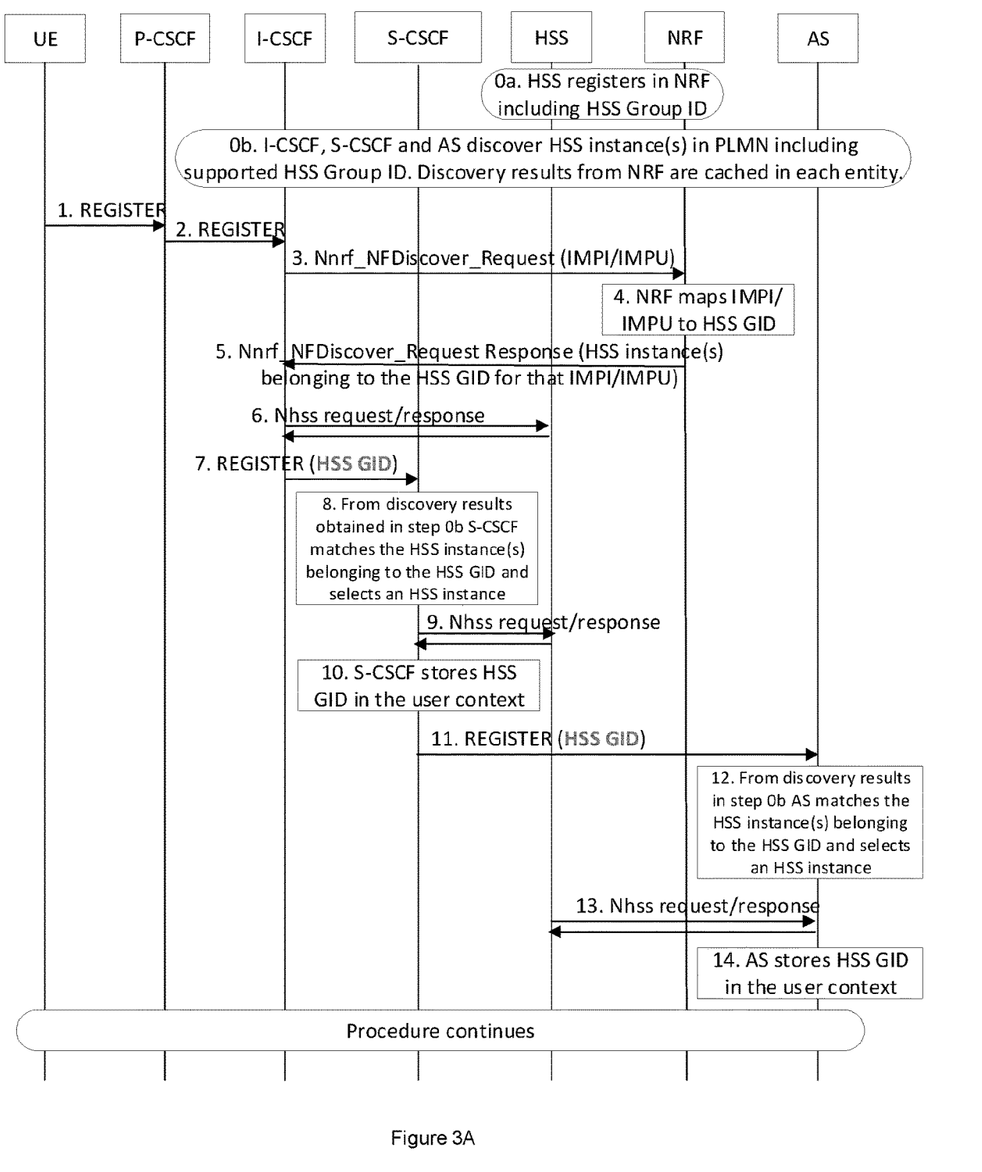
FIG. 3A illustrates a complete procedure for the optimized call flow when HSS Group IDs are deployed by HSS instances according to some embodiments.

FIG. 3A illustrates complete procedure for the optimized call flow when Group IDs are deployed by HSS instances.

In step 0a of FIG. 3A, an SBI capable HSS instance registers in NRF using Nnrf_NFManagement_NFRegister_Request. The HSS instance registers in this case a Group ID.

In step 0b, any SBI capable IMS entity (I-CSCF, AS, S-CSCF, etc.) may discover the SBI capable HSS instances, including the Group ID available in the PLMN at any time using a Nnrf_NFDiscovery_Request. Each SBI capable IMS entity doing a discovery caches the result of the NRF discovery. For example, each SI capable IMS entity may receive, from the NRF, an indication of a plurality of HSS instances each associated with at least one HSS group identification; and may store the indication of the plurality of HSS instances and the associated at least one HSS group identification.

In step 1 of FIG. 3A, after the UE has obtained IP connectivity, it may perform IMS registration. To do so, the UE sends the Register information flow to the P-CSCF. The Register information flow is used as an example and other SIP messages may be used for example SIP INVITE. Any message comprising the user identification may be suitable.

In step 2 of FIG. 3A, The P-CSCF may send the Register information flow to the I-CSCF.

In step 3 of FIG. 3A, The I-CSCF locates in its cache only HSS instance(s) with a Group ID and needs to do a second discovery to locate the HSS instance handling the registering UE. The I-CSCF sends an Nnrf_NFDiscovery_Request to the NFR and includes the user identification IMPI/IMPU. The I-CSCF therefore transmits a request to a network repository function, NRF, wherein the request comprises the user identification.

In step 4 of FIG. 3A, the NRF maps the user identification (IMPI/IMPU) to the HSS Group ID.

In step 5 of FIG. 3A, the NRF returns to the I-CSCF the first HSS instance corresponding to the Group ID for the registering IMPI/IMPU, as well as the Group ID. The I-CSCF therefore receives an indication of a first HSS group identification from the NRF. The I-CSCF may also receive an indication of a type of interface to be used with the first HSS instance from the NRF in this step.

In step 6 of FIG. 3A, The I-CSCF queries the first HSS instance to locate S-CSCF allocated to the UE, or provide information for the I-SCSF to select an S-CSCF, to fetch the context information for the registering IMPU/IMPI pair by sending an Nhss_ims_UECM_Get request to the UDM/HSS instance.

In step 7 of FIG. 3A, the I-CSCF forwards the Register request (or other SIP message) to the S-CSCF, and includes in this case the first HSS Group ID. For example, the I-CSCF may include the first HSS Group ID of the SBI capable HSS instances associated with the IMS user in an <HSS Group ID> header field in SIP REGISTER and/or INVITE messages. In general therefore, the I-CSCF may transmit a Session Initiation Protocol, SIP, message to the second SBI capable IMS entity, wherein the SIP message comprises a first header field comprising the indication of the first HSS group identification.

Furthermore, the I-CSCF may also include a type of interface to be used with first HSS instance and/or the first HSS Group ID of the SBI capable HSS instances associated with the IMS user in a <HSS interface type> and <HSS Group ID> header fields respectively in SIP 3$^{rd}$ Party REGISTER and INVITE messages (or other suitable SIP message). In other words, the SIP message may further comprise a second header field comprising an indication of a type of interface to be used with the first HSS instance.

In step 8 of FIG. 3A, the S-CSCF locates the first HSS instance for the registering wireless device. In this case, the S-CSCF examines its cache from the discovery request performed in step 0b to locate the first HSS instance that maps to the received first HSS Group ID. In other words, the S-CSCF selects a first HSS instance from a stored indication of a plurality of HSS instances, wherein the plurality of HSS instances are each associated with at least one HSS group identification, by selecting the first HSS instance having an associated HSS group identification that matches the first HSS group identification received in step 7.

In step 9 of FIG. 3A, the S-CSCF fetches the registered IMPI/IMPU related subscriber information by sending to the UDM/HSS instance an Nhss_ims_SDM Get request and receiving the subscriber information profile in the corresponding response.

In step 10 of FIG. 3A, the S-CSCF stores the Group ID in the user context.

In step 11 of FIG. 3A, the S-CSCF sends the REGISTER Request (or any other suitable SIP message) to the AS in case of third-party registration (or other procedure) and includes the first HSS Group ID in this case. For example, as previously, the S-CSCF may transmit the first HSS Group ID in a first header field of the SIP message. Furthermore, the S-CSCF may also include a second header field comprising an indication of the type of interface to use with the first HSS instance. This indication of the type of interface may have been received from the I-CSC in the message transmitted in Step 7 of FIG. 3A.

In step 12 of FIG. 3A, the AS locates the first HSS instance for the registering wireless device. In this case, the AS examines its cache from the discovery request performed in step 0b to locate the first HSS instance that maps to the received first HSS Group ID. In other words, the AS selects a first HSS instance from a stored indication of a plurality of HSS instances, wherein the plurality of HSS instances are each associated with at least one HSS group identification, by selecting the first HSS instance having an associated HSS group identification that matches the first HSS group identification received in step 11.

In step 13 of FIG. 3A, the AS queries the first HSS instance for the wireless device profile.

In step 14 of FIG. 3A, the IMS AS stores the first HSS Group ID in the user context.

The S-CSCF and IMS AS may store the information regarding the type of interface to be used with first HSS instance and/or the HSS Group ID of the SBI capable HSS instances associated with the IMS user for future use.

Figure 3B:
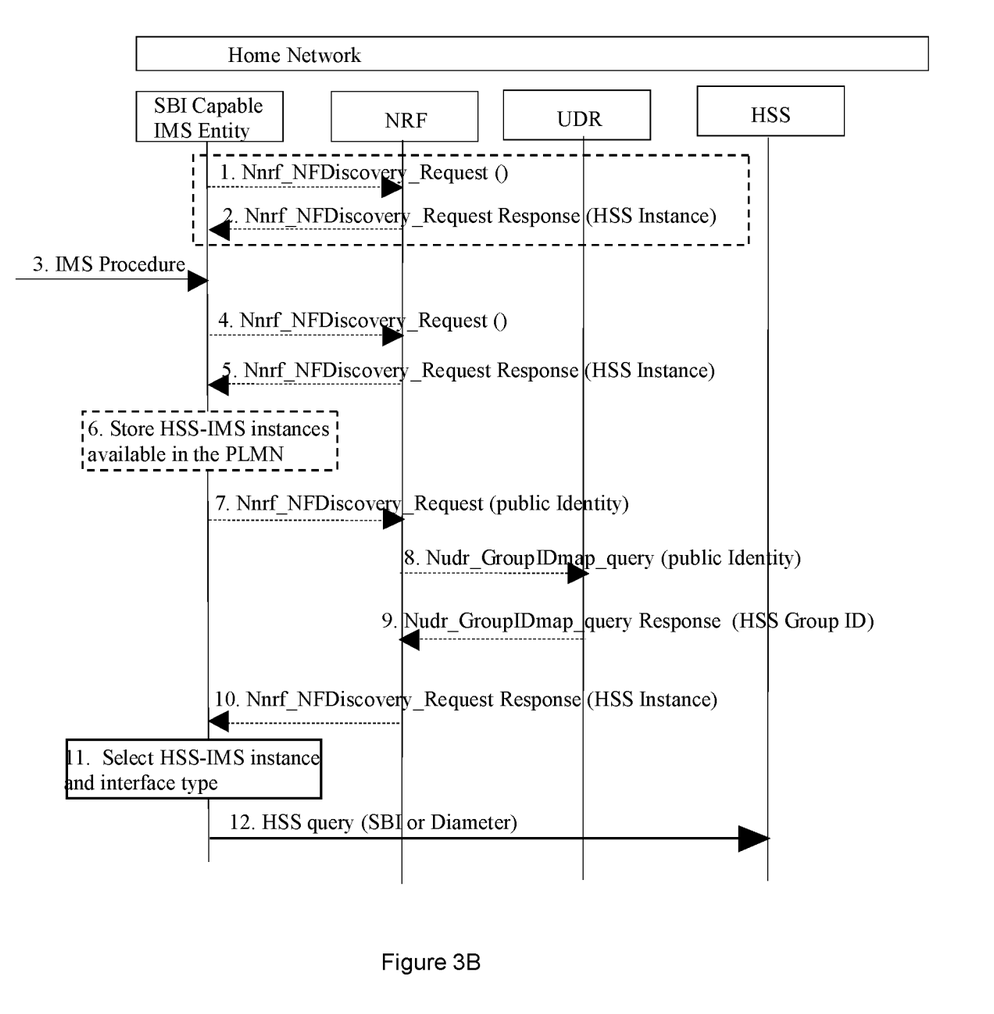
FIG. 3B illustrates a method for obtaining and providing HSS information according to some embodiments.

In further aspects of embodiments, an SBI capable IMS entity may transmit an NRF discovery request (Nnrf_NFDiscovery Request Q) at any time to the NRF. This is shown in FIG. 3B, in which the discovery request is sent in step 1, before the IMS procedure begins (in step 3). In response to the NRF discovery request, the NRF may transmit to the SBI capable IMS entity a response (in step 2 of FIG. 3B, Nnrf_NFDiscovery_Request Response (HSS Instance)). The discovery request may be triggered by any suitable trigger, implementation dependent. As an example of this, in some aspects of embodiments the discovery request may be triggered by the power up of the SBI capable IMS entity.

As discussed above, the discovery request may be sent before an IMS procedure; alternatively, the discovery request and response may be performed after the IMS procedure. The discovery request and response after the IMS procedure are shown by steps 4 and 5 respectively in FIG. 3B.

The response to the discovery request may comprise HSS information related to the PLMN. In situations where no SBI capable HSS instance or HSS Group ID is available in the PLMN, the HSS information provided may comprise an indication that no SBI capable HSS instance or HSS Group ID is available in the PLMN. The indication that that no SBI capable HSS instance or HSS Group ID is available in the PLMN may be, for example, an empty discovery result from the NRF, or an explicit instruction from the NRF to use an alternative system such as Diameter.

Alternatively, the HSS information may comprise indicators of one or more HSS instances and/or HSS Group IDs registered in the PLMN, in particular, the response may comprise an indication of a plurality of HSS instances each associated with at least one HSS Group ID (which may also be provided).

If the discovery request is sent without including a user ID (where the user ID may be an IMPI or IMPU), then the discovery request may be referred to as a generic discovery request and the response from the NRF may include information on any available HSS instances and/or HSS Group IDs registered in the PLMN. The generic discovery request may be based on a PLMN ID. Each HSS NF profile may include the information about supported HSS Group ID. Different HSS instances may support different HSS Group IDs. By contrast, if the discovery request includes a user ID, the response from the NRF may include information relating only to the HSS instances and/or HSS Group IDs registered in the PLMN that may handle the specific user associated with the user ID.

When the SBI capable IMS entity has received the response from the NRF, the HSS information may be stored at the first SBI capable IMS entity. This is shown in step 6 of FIG. 3B. Although step 6 is shown in FIG. 3B as occurring after the start of the IMS procedure (in step 3), the storage may take place at any time after the discovery request response has been received by the SBI capable IMS entity.

The IMS procedure (see step 3) may be an SIP procedure related to a specific user having a specific user ID which, as discussed above, may be an IMPI or IMPU, or another form of user ID. When the IMS procedure begins, the SBI capable IMS entity may send a further discovery request to the NRF, the further discovery request including the user ID (see step 7 of FIG. 3B). The NRF may then submit a group ID map query including the user ID to the UDR (see step 8), and may obtain from the UDR one or more given HSS group ID for one or more groups handling the user associated with the user ID (see step 9). The given HSS group ID (or IDs) is then mapped by the NRF to the corresponding HSS instance for the HSS Group ID, and the corresponding NF profiles of these HSS instances may then be sent in the response from the NRF to the SBI capable IMS entity (see step 10). The SBI capable IMS entity may then store this information, that is, the HSS group ID may be stored in association with the specific user ID.

As discussed above, the SBI capable IMS entity may transmit HSS information to one or more further SBI capable IMS entities (for example, entities in an SIP signalling path). All of the HSS information obtained from the NRF may be transmitted to further SBI capable IMS entities, for example, where the HSS information is an indication no SBI capable HSS instance or HSS Group ID is available in the PLMN, this indication may be transmitted. Where no SBI capable HSS instance or HSS Group ID is available in the PLMN, the IMS entity may transmit an instruction to the further IMS entity to use an alternate system, for example, an indication that Diameter should be used by the further IMS entity. The instruction may be sent, for example in a header. Alternatively, a portion of the HSS information received by the SBI capable IMS entity may be transmitted to further SBI capable IMS entities. The HSS information may comprise an HSS Group ID serving a specific user. In some aspects of embodiments, a Session Initiation Protocol, SIP, message may be transmitted to a further SBI capable IMS entity, wherein the SIP message comprises a first header field comprising a given HSS Group ID related to a given HSS instance that is serving the IMS user, wherein the given HSS Group ID is obtained from the HSS information.

The further SBI capable IMS entity that receives a message comprising HSS information from the first SBI capable IMS may then store the HSS information, and may use the contents of the message to minimise further NRF queries. Where the HSS information is an indication that no SBI capable HSS instance or HSS Group ID is available in the PLMN, the further SBI capable IMS entity may use this information to avoid transmitting NRF discovery requests (which would return negative results indicating no SBI capable HSS instance or HSS Group ID is available), and may instead attempt to communicate with the HSS using Diameter procedures as discussed above. Alternatively, the HSS information may comprise a given HSS Group ID that is related to a given HSS instance, wherein the given HSS instance is serving an IMS user connected to the first SBI capable IMS entity.

Where the HSS information comprises a given HSS Group ID, the further SBI capable IMS entity may select a first HSS instance from a stored indication of a plurality of HSS instances, wherein the plurality of HSS instances are each associated with at least one HSS Group ID, by selecting a particular HSS instance having an associated HSS group ID that matches the given HSS Group ID indicated in the HSS information. This step may be performed by the further SBI capable IMS entity where that entity has obtained and stored an indication of a plurality of HSS instances each associated with at least one SS Group ID, either by sending a request to the NRF and receiving a response as set out above in the context of the first SBI capable IMS entity, or from another source.

Where the HSS information comprises a given HSS Group ID but the further SBI capable IMS entity has not obtained an indication of a plurality of HSS instances each associated with at least one HSS Group ID, the further SBI capable IMS entity may then transmit a discovery request to a network repository function, NRF, the discovery request comprising the given HSS Group ID, and receive a response comprising HSS information related to the given HSS Group ID from the NRF. The further SBI capable IMS entity may then store the HSS information related to the given HSS Group ID.

In the above aspects of embodiments, the first SBI capable IMS entity may comprise, for example, an Interrogating Call Session Control Function (I-CSCF) or a Serving Call Session Control Function (S-CSCF). The further SBI capable IMS entity may comprise, for example, a Serving Call Session Control Function (S-CSCF) or an IMS Application Server (IMS AS).

Figure 4:
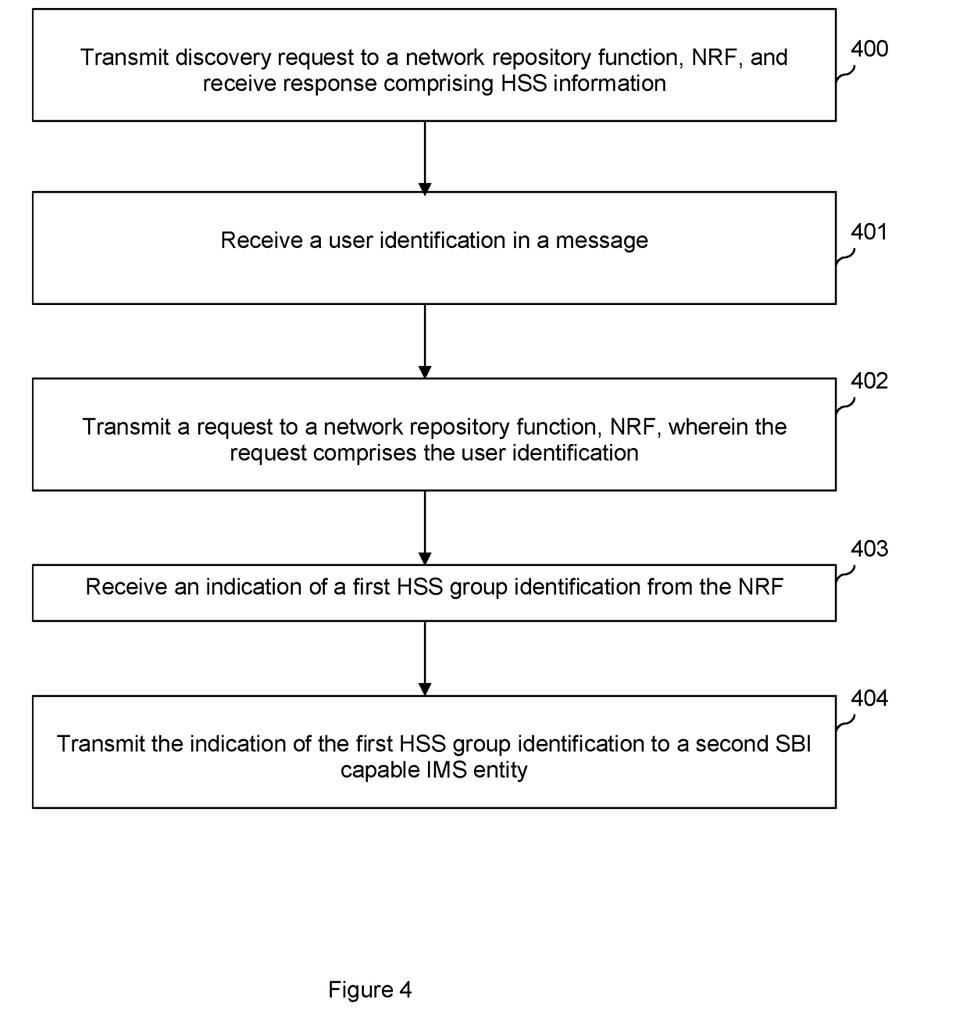
FIG. 4 illustrates a method, in a first service based architecture, SBI, capable Internet Protocol Multimedia Subsystem, IMS, entity according to some embodiments.

FIG. 4 illustrates a method, in a first service based architecture, SBI, capable Internet Protocol Multimedia Subsystem, IMS, entity for providing information relating to a first Home Subscriber Service, HSS, instance. The method may be performed by an I-CSCF or an S-CSCF.

In step 400, the method comprises transmitting a discovery request to a network repository function, NRF. As explained above with reference to FIG. 3B, this step may be performed before step 401, wherein the discovery request is a generic discovery request that does not contain a user ID. Alternatively or additionally, a request comprising the user ID may be transmitted as discussed below with reference to step 402. In some aspects of embodiments, step 400 may be omitted.

In step 401, the method comprises receiving a user identification in a message. The message may comprise any suitable SIP protocol message, for example SIP REGISTER or SIP INVITE. The user identification may comprise an IP Multimedia Private Identity (IMPI) and/or an IP Multimedia Public Identity (IMPUs). In examples where the first SBI capable IMS entity comprises an I-CSCF the message may be received from a P-CSCF. In examples where the first SBI capable IMS entity comprises an S-CSCF the message may be received from an I-CSCF.

In step 402, the method comprises transmitting a request to a network repository function, NRF, wherein the request comprises the user identification.

In step 403, the method comprises receiving an indication of a first HSS group identification from the NRF.

In step 404, the method comprises transmitting the indication of the first HSS group identification to a second SBI capable IMS entity. In examples where the first SBI capable IMS entity comprises an I-CSCF, the second SBI capable IMS entity may comprise an S-CSCF. In examples where the first SBI capable IMS entity comprises an S-CSCF, the second SBI capable IMS entity may comprise an IMS AS.

The indication may be transmitted as part of an SIP message. For example, the indication may be included in a header field in the forwarding of the message received in step 401 to the second SBI capable IMS entity.

Figure 5A:
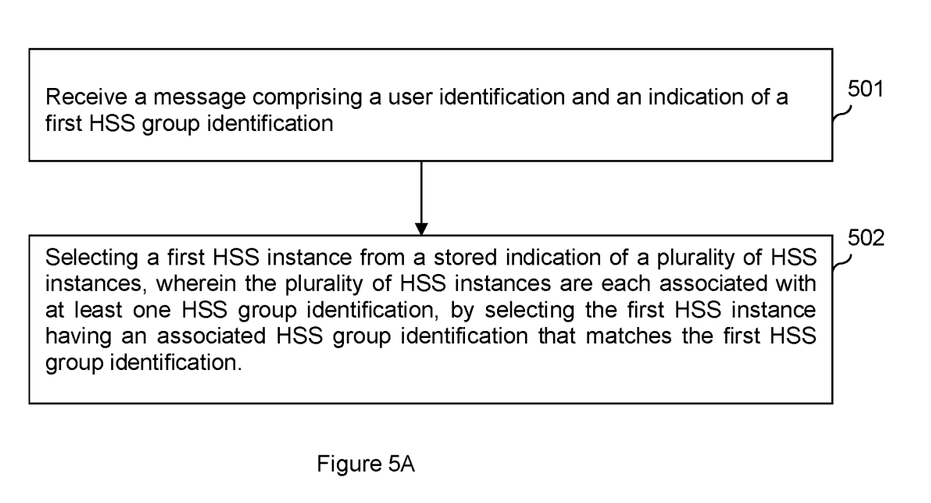
FIG. 5A illustrates a method, in a second service based architecture, SBI, capable Internet Protocol Multimedia Subsystem, IMS, entity according to some embodiments.

FIG. 5A illustrates a method, in a second service based architecture, SBI, capable Internet Protocol Multimedia Subsystem, IMS, entity for providing information relating to a first Home Subscriber Service, HSS, instance. In some examples, the second SBI capable IMS entity comprises an S-CSCF. In some examples, the second SBI capable IMS entity comprises an IMS AS.

In step 501 the method comprises receiving a message comprising a user identification and an indication of a first HSS group identification. The message may comprise any suitable SIP message, for example SIP REGISTER or SIP INVITE. In examples where the second SBI capable IMS entity comprises an S-CSCF, the message may be received from an I-CSCF. In examples where the second SBI capable IMS entity comprises an IMS AS, the message may be received from an S-CSCF.

The indication of the first HSS group identification may be indicated in a first header field of the message.

In step 502, the method comprises selecting a first HSS instance from a stored indication of a plurality of HSS instances, wherein the plurality of HSS instances are each associated with at least one HSS group identification, by selecting the first HSS instance having an associated HSS group identification that matches the first HSS group identification.

Figure 5B:
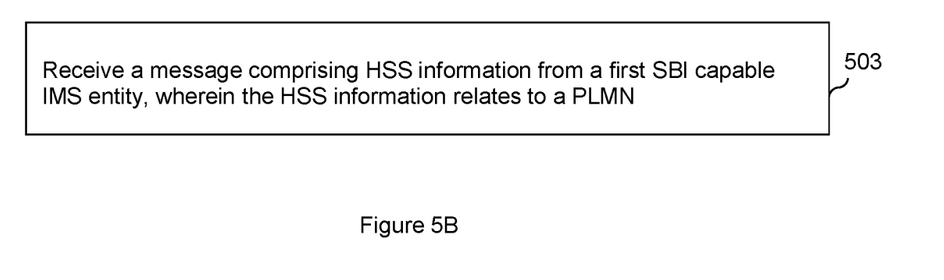
FIG. 5B illustrates a further method, in a second service based architecture, SBI, capable Internet Protocol Multimedia Subsystem, IMS, entity according to some embodiments.

FIG. 5B illustrates a further method in a second service based architecture, SBI, capable Internet Protocol Multimedia Subsystem, IMS, entity for obtaining Home Subscriber Service, HSS, information. In some examples, the second SBI capable IMS entity comprises an S-CSCF. In some examples, the second SBI capable IMS entity comprises an IMS AS.

In step 503, the method comprises receiving a message comprising HSS information from a first SBI capable IMS entity, wherein the HSS information relates to a Public Land Mobile Network, PLMN.

The HSS information may comprises a given HSS Group ID that is related to a given HSS instance, wherein the given HSS instance is serving an IMS user connected to the first SBI capable IMS entity. In this case, the method may further comprise selecting a first HSS instance from a stored indication of a plurality of HSS instances, wherein the plurality of HSS instances are each associated with at least one HSS Group ID, by selecting the first HSS instance having an associated HSS group ID that matches the given HSS Group ID indicated in the HSS information. Alternatively, the HSS information may be an indication that no SBI capable HSS instance or HSS Group ID is available in the PLMN. In this case, the method may further comprise selecting Diameter procedures to communicate with the HSS.

Figure 6:
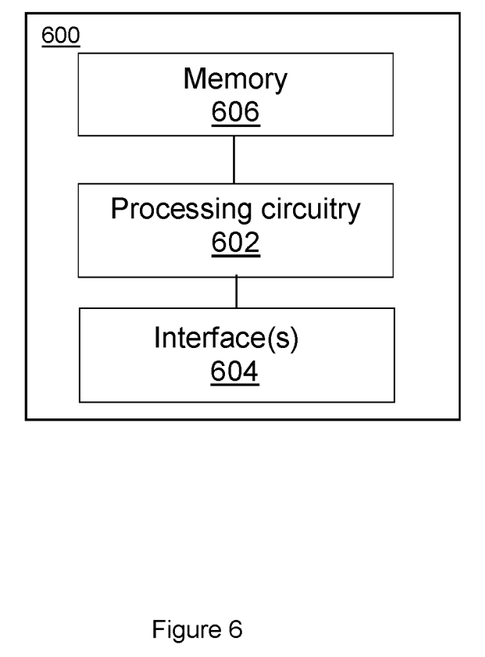
FIG. 6 illustrates a first service based architecture, SBI, capable Internet Protocol Multimedia Subsystem, IMS, entity according to some embodiments.

FIG. 6 is a schematic diagram of a first SBI capable IMS entity 600.

The first SBI capable IMS entity 600 comprising processing circuitry (or logic) 602. The processing circuitry 602 controls the operation of the first SBI capable IMS entity 600 and can implement the method described above with respect to FIG. 4 or the I-SCSF in FIG. 3A, for example. The processing circuitry 602 of the first SBI capable IMS entity 600 can also implement the method as shown in FIG. 3B. The first SBI capable IMS entity 600 may also comprise an S-CSCF. The processing circuitry 602 can comprise one or more processors, processing units, multi-core processors or modules that are configured or programmed to control the first SBI capable IMS entity 600 in the manner described herein. In particular implementations, the processing circuitry 602 can comprise a plurality of software and/or hardware modules that are each configured to perform, or are for performing, individual or multiple steps of the method described herein in relation to the first SBI capable IMS entity 600.

Briefly, the processing circuitry 602 of the first SBI capable IMS entity 600 may be configured to: receive a user identification in a message; transmit a request to a network repository function, NRF, wherein the request comprises the user identification; receive an indication of a first HSS group identification from the NRF; and transmit the indication of the first HSS group identification to a second SBI capable IMS entity. The processing circuitry 602 may additionally or alternatively be configured to: transmit a discovery request to a network repository function, NRF; receive a response comprising HSS information from the NRF; and transmit at least a portion of the HSS information to a second SBI capable IMS entity.

In some embodiments, the first SBI capable IMS entity 600 may optionally comprise a communications interface 604. The communications interface 604 of the first SBI capable IMS entity 600 can be for use in communicating with other nodes, such as other virtual nodes. For example, the communications interface 604 of the first SBI capable IMS entity 600 can be configured to transmit to and/or receive from other nodes requests, resources, information, data, signals, or similar. The processing circuitry 602 of the first SBI capable IMS entity 600 may be configured to control the communications interface 604 of the first SBI capable IMS entity 600 to transmit to and/or receive from other nodes requests, resources, information, data, signals, or similar.

Optionally, the first SBI capable IMS entity 600 may comprise a memory 606. In some embodiments, the memory 606 of the first SBI capable IMS entity 600 can be configured to store program code that can be executed by the processing circuitry 602 of the first SBI capable IMS entity 600 to perform the method described herein in relation to the first SBI capable IMS entity 600. Alternatively or in addition, the memory 606 of the first SBI capable IMS entity 600, can be configured to store any requests, resources, information, data, signals, or similar that are described herein. The processing circuitry 602 of the first SBI capable IMS entity 600 may be configured to control the memory 606 of the first SBI capable IMS entity 600 to store any requests, resources, information, data, signals, or similar that are described herein.

Figure 7:
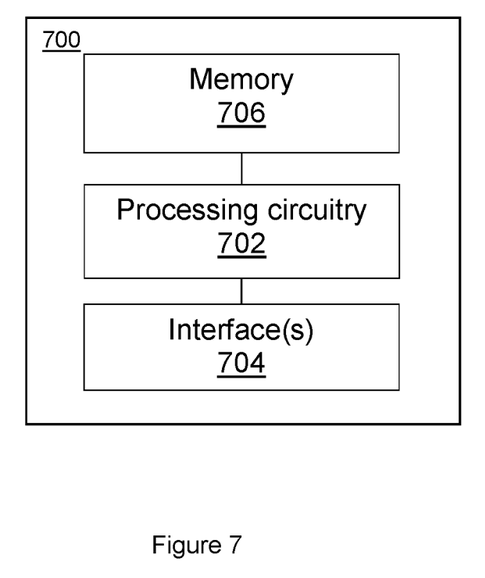
FIG. 7 illustrates a second service based architecture, SBI, capable Internet Protocol Multimedia Subsystem, IMS, entity according to some embodiments.

FIG. 7 is a schematic diagram of a second SBI capable IMS entity 700.

The second SBI capable IMS entity 700 comprising processing circuitry (or logic) 702. The processing circuitry 702 controls the operation of the second SBI capable IMS entity 700 and can implement the method described above with respect to FIG. 5A or 5B or the S-SCSF or IMS AS in FIG. 3A, for example. The processing circuitry 702 of the second SBI capable IMS entity 700 can also implement the method as shown in FIG. 3B. The processing circuitry 702 can comprise one or more processors, processing units, multi-core processors or modules that are configured or programmed to control the second SBI capable IMS entity 700 in the manner described herein. In particular implementations, the processing circuitry 702 can comprise a plurality of software and/or hardware modules that are each configured to perform, or are for performing, individual or multiple steps of the method described herein in relation to the second SBI capable IMS entity 700.

Briefly, the processing circuitry 702 of the second SBI capable IMS entity 700 may be configured to: receive a message comprising a user identification and an indication of a first HSS group identification; and select a first HSS instance from a stored indication of a plurality of HSS instances, wherein the plurality of HSS instances are each associated with at least one HSS group identification, by selecting the first HSS instance having an associated HSS group identification that matches the first HSS group identification. The processing circuitry 702 may additionally or alternatively be configured to receive a message comprising HSS information from a first SBI capable IMS entity, wherein the HSS information relates to a Public Land Mobile Network, PLMN.

In some embodiments, the second SBI capable IMS entity 700 may optionally comprise a communications interface 704. The communications interface 704 of the second SBI capable IMS entity 700 can be for use in communicating with other nodes, such as other virtual nodes. For example, the communications interface 704 of the second SBI capable IMS entity 700 can be configured to transmit to and/or receive from other nodes requests, resources, information, data, signals, or similar. The processing circuitry 702 of the second SBI capable IMS entity 700 may be configured to control the communications interface 704 of the second SBI capable IMS entity 700 to transmit to and/or receive from other nodes requests, resources, information, data, signals, or similar.

Optionally, the second SBI capable IMS entity 700 may comprise a memory 706. In some embodiments, the memory 706 of the second SBI capable IMS entity 700 can be configured to store program code that can be executed by the processing circuitry 702 of the second SBI capable IMS entity 700 to perform the method described herein in relation to the second SBI capable IMS entity 700. Alternatively or in addition, the memory 706 of the second SBI capable IMS entity 700, can be configured to store any requests, resources, information, data, signals, or similar that are described herein. The processing circuitry 702 of the second SBI capable IMS entity 700 may be configured to control the memory 706 of the second SBI capable IMS entity 700 to store any requests, resources, information, data, signals, or similar that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The invention claimed is:

1. A first service based interface, SBI, capable Internet Protocol Multimedia Subsystem, IMS, entity for providing information relating to a first Home Subscriber Service, HSS, instance, the first SBI capable IMS entity comprising processing circuitry configured to:
   receive a user identification in a message;
   transmit a request to a network repository function, NRF, the request comprising the user identification;
   receive an indication of a first HSS group identification from the NRF, the first HSS group identification identifying at least the first HSS instance, at least the first HSS instance being an SBI capable HSS instance; and
   transmit the indication of the first HSS group identification to a second SBI capable IMS entity, the transmitted indication triggering the second SBI capable IMS entity to select at least the first HSS instance previously discovered by the second SBI capable IMS entity and that matches the first HSS group identification, the selection being performed without performing an additional request to the NRF.

2. The first SBI capable IMS entity of claim 1, wherein the processing circuitry causes the first SBI capable IMS entity to, prior to receiving the user identification for the registering user:

receive, from the NRF, an indication of a plurality of HSS instances each associated with at least one HSS group identification; and store the indication of the plurality of HSS instances and the associated at least one HSS group identification.

3. The first SBI capable IMS entity of claim 1, wherein transmitting the indication of the first HSS group identification to the second SBI capable IMS entity comprises:

transmitting a Session Initiation Protocol, SIP, message to the second SBI capable IMS entity, wherein the SIP message comprises a first header field comprising the indication of the first HSS group identification.

4. The first SBI capable IMS entity of claim 3, wherein the processing circuitry causes the first SBI capable IMS entity to:

receive an indication of a type of interface to be used at least with the first HSS instance from the NRF; and wherein the SIP message further comprises a second header field comprising the indication of a type of interface to be used at least with the first HSS instance.

5. The first SBI capable IMS entity of claim 1, wherein the processing circuitry causes the first SBI capable IMS entity to, prior to transmitting the indication of the first HSS group identification to the second SBI capable IMS entity, to:

obtain an identification of at least the first HSS instance; and transmit a query to the HSS instance to retrieve information relating to the second SBI capable IMS entity.

6. The first SBI capable IMS entity of claim 5, wherein the obtaining comprises receiving the identification of at least the first HSS instance from the NRF.

7. The first SBI capable IMS entity of claim 5, wherein the obtaining comprises selecting at least the first HSS instance from the plurality of HSS instances by selecting at least the first HSS instance having an associated HSS group identification that matches the first HSS group identification.

8. The first SBI capable IMS entity of claim 1, wherein the first SBI capable IMS entity comprises one of an Interrogating Call Session Control Function, I-CSCF, and a Serving Call Session Control Function, S-CSCF.

9. The first SBI capable IMS entity of claim 1, wherein the second SBI capable IMS entity comprises one of a Serving Call Session Control Function, S-CSCF, and an IMS Application Server, IMS AS.

10. A second service based interface, SBI, capable Internet Protocol Multimedia Subsystem, IMS, entity for providing information relating to a first Home Subscriber Service, HSS, instance, the second SBI capable IMS entity comprising processing circuitry configured to:

receive a message comprising a user identification and an indication of a first HSS group identification; and in response at least to the indication of the first HSS group identification, select at least a first HSS instance from a stored indication of a plurality of HSS instances, at least the first HSS instance being previously discovered by the second SBI capable IMS entity, each one of the plurality of HSS instances being associated with at least one HSS group identification, the selection being performed, without performing an additional request to a network repository function, NRF, by selecting at least the first HSS instance having an associated HSS group identification that matches the first HSS group identification, the first HSS group identification identifying at least the first HSS instance, the first HSS instance being an SBI capable HSS instance.

11. The second SBI capable IMS entity of claim 10, wherein the processing circuitry causes the second SBI capable IMS entity to, prior to receiving the message:

receive, from the NRF, the indication of the plurality of HSS instances each associated with at least one HSS group identification; and store the indication of the plurality of HSS instances and the associated at least one HSS group identification.

12. The second SBI capable IMS entity of claim 10, wherein the processing circuitry causes the second SBI capable IMS entity to:

transmit a request at least to the first HSS instance to retrieve subscriber information relating to the user identification.

13. The second SBI capable IMS entity of claim 10, wherein the message further comprises an indication of a type of interface to be used at least with the first HSS instance.

14. The second SBI capable IMS entity of claim 10, wherein the message comprises a Session Initiation Protocol, SIP, message.

15. The second SBI capable IMS entity of claim 10, wherein the message comprises a header field indicating the first HSS group identification.

16. The second SBI capable IMS entity of claim 10, wherein the second SBI capable IMS entity comprises one of a Serving Call Session Control Function, S-CSCF, and an IMS Application Server, IMS AS.

17. A first service based interface, SBI, capable Internet Protocol Multimedia Subsystem, IMS, entity for obtaining and providing Home Subscriber Service, HSS, information, the first SBI capable IMS entity comprising processing circuitry configured to:

transmit a discovery request to a network repository function, NRF; receive a response comprising HSS information from the NRF, the HSS information relating to a Public Land Mobile Network, PLMN, and comprising indicators at least of a plurality of HSS group identifications registered in the PLMN, each HSS group identification of the plurality of HSS group identifications identifying at least one HSS instance, the at least one HSS instance being an SBI capable HSS instance; and transmit at least a portion of the HSS information to a second SBI capable IMS entity; and transmit an indication of a first HSS group identification of the plurality of HSS group identifications to the second SBI capable IMS entity, the first HSS group identification identifying at least a first HSS instance, the transmitted indication triggering the second SBI capable IMS entity to select at least the first HSS instance previously discovered by the second SBI capable IMS entity and that matches the first HSS group identification, the selection being performed without performing an additional request to the NRF.

18. The first SBI capable IMS entity of claim 17, wherein the HSS information is an indication that one of no SBI capable HSS instance is available in the PLMN and no HSS Group identification is available in the PLMN.

19. The first SBI capable IMS entity of claim 17, wherein the HSS information further comprises the indicators of the at least one HSS instance registered in the PLMN.

* * * * *